US011878364B2

(12) United States Patent
Chen et al.

(10) Patent No.: US 11,878,364 B2
(45) Date of Patent: Jan. 23, 2024

(54) METHOD FOR DETECTING SURFACE WELDING QUALITY OF FRICTION STIR WELDING

(71) Applicant: SOOCHOW UNIVERSITY, Suzhou (CN)

(72) Inventors: Liguo Chen, Suzhou (CN); Yusheng Xu, Suzhou (CN); Wenxia Zhang, Suzhou (CN); Yongyong Lin, Suzhou (CN); Yangjun Wang, Suzhou (CN); Huade Zhang, Suzhou (CN); Liwei Xue, Suzhou (CN); Guoshun Yang, Suzhou (CN); Lining Sun, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/036,880

(22) PCT Filed: Oct. 26, 2022

(86) PCT No.: PCT/CN2022/127634
§ 371 (c)(1),
(2) Date: May 13, 2023

(65) Prior Publication Data
US 2023/0415258 A1      Dec. 28, 2023

(51) Int. Cl.
*B23K 20/00*   (2006.01)
*B23K 20/12*   (2006.01)

(52) U.S. Cl.
CPC ................................ *B23K 20/124* (2013.01)

(58) Field of Classification Search
CPC .... B23K 11/04; B23K 11/25; B23K 20/1255; B23K 20/26; B23K 37/08
See application file for complete search history.

(56) References Cited

U.S. PATENT DOCUMENTS 3,509,310 A * 4/1970 Riley .................. B23K 11/043
219/97
4,487,070 A * 12/1984 Gerling .............. G01N 29/4445
73/620

(Continued)

FOREIGN PATENT DOCUMENTS

CN      111462110 A     7/2020
CN      111983030 A     11/2020

(Continued)

*Primary Examiner* — Erin B Saad
(74) *Attorney, Agent, or Firm* — SZDC Law PC (57) ABSTRACT

A method for detecting a surface welding quality of friction stir welding includes: acquiring a continuous surface depth image of a welding seam; intercepting a surface depth image segment of the welding seam with a proper step size, and dividing the intercepted surface depth image segments of the welding seam into a front reference region, a thinned region and a rear reference region; judging whether flatness of the front reference region is less than a threshold, and if yes, taking a height of the front reference region at this point as a latest reference height; if no, judging whether the flatness of the rear reference region is less than the threshold, and if yes, taking a height of the rear reference region at this point as the latest reference height; if no, taking the reference height of previous depth image segment as the latest reference height; and calculating a difference.

10 Claims, 5 Drawing Sheets

(56) References Cited

U.S. PATENT DOCUMENTS

| | | | | |
|---|---|---|---|---|
| 6,153,848 | A | * | 11/2000 | Nagae ................... B23K 11/25 |
| | | | | 219/110 |
| 10,661,379 | B1 | * | 5/2020 | Larsson ................ B23K 37/08 |
| 2002/0134817 | A1 | * | 9/2002 | Shepard ................ G01N 25/72 |
| | | | | 228/105 |
| 2011/0296923 | A1 | | 12/2011 | Cataldo et al. |
| 2017/0103101 | A1 | * | 4/2017 | Mason ............... G06F 16/2365 |
| 2017/0109373 | A1 | * | 4/2017 | Sung ..................... H04L 69/22 |
| 2017/0182605 | A1 | * | 6/2017 | Rajagopalan ............ B23K 9/32 |
| 2017/0274467 | A1 | * | 9/2017 | Rajagopalan ........ B23K 9/1087 |

FOREIGN PATENT DOCUMENTS

| | | |
|---|---|---|
| CN | 112067623 A | 12/2020 |
| CN | 113610814 A | 11/2021 |
| CN | 114354618 A | 4/2022 |
| CN | 115070251 A | 9/2022 |

* cited by examiner

METHOD FOR DETECTING SURFACE WELDING QUALITY OF FRICTION STIR WELDING

This application is the National Stage Application of PCT/CN2022/127634, filed on Oct. 26, 2022, which claims priority to Chinese Patent Application No. 202210742311.X, filed on Jun. 27, 2022, which is incorporated by reference for all purposes as if fully set forth herein.

FIELD OF THE DISCLOSURE

The present invention relates to the field of friction stir welding seam detection technologies, and particularly to a method for detecting a surface welding quality of friction stir welding.

BACKGROUND OF THE DISCLOSURE

A friction stir welding technology proposed by The Welding Institute in 1991 is a typical novel green welding technology, has a welding process in which no smoke and arc light are generated, avoids gas protection and other material filling, and particularly has great advantages for aluminum alloy welding, such that the friction stir welding technology is widely applied to manufacturing of various aluminum alloy structural parts in the fields of aerospace, automobiles, ships, rail vehicles, or the like.

The friction stir welding has a working principle that a stirring head rotating at a high speed pierces a workpiece, and friction heat is generated at a contact position, such that metal forms a plastic softening layer; an upsetting force is applied to a welding material by a stirring pin shaft shoulder, so as to press a rear material to fill a cavity; however, in the welding process, a pressing amount, a main shaft rotating speed, a feeding speed, or the like, are generally required to be artificially regulated and controlled, and conditions of welding defects, an excessive thinning amount, a flash, or the like, may occur at a welding seam. Currently, defects of welded grooves, or the like, are mainly detected by means of artificial identification. In detection of the thinning amount, usually, after welding is completed, the welding material is detached from a tool, and then, a thickness of the welding seam is detected using an acoustic thickness gauge, and therefore, manpower is consumed, and the tool is quite difficult to reset after a problem is found. No effective detection means exists for the flash, and the flash is directly removed by manual shoveling using a pneumatic flat shovel or milling after welding. The friction stir welding generally has a speed of 0.4 m/min to 2 m/min, and belongs to automatic high-speed welding, and the final welding quality is only detected manually, which cannot adapt to the speed range, thus greatly limiting a production efficiency.

SUMMARY OF THE DISCLOSURE

In order to overcome defects in a prior art, an object of the present invention is to provide a method for detecting a surface welding quality of friction stir welding.

In order to achieve the above object, an embodiment of the present invention provides the following technical solution.

A method for detecting a surface welding quality of friction stir welding, comprising the following steps:

(1) acquiring a continuous surface depth image of a welding seam;

(2) intercepting a surface depth image segment of the welding seam with a proper step size, and dividing the intercepted surface depth image segments of the welding seam into a front reference region, a thinned region and a rear reference region;

(3) judging whether flatness of the front reference region is less than a threshold, and if yes, taking a height of the front reference region at this point as a latest reference height; if no, judging whether the flatness of the rear reference region is less than the threshold, and if yes, taking a height of the rear reference region at this point as the latest reference height; if no, taking the reference height of the previous depth image segment as the latest reference height; and (4) calculating a difference between the latest reference height and an average height of the thinned region at this point to obtain a thinning amount.

The present invention has the beneficial effects as follows.

In the present invention, during the friction stir welding, the surface depth image of the friction stir welding seam is acquired through laser scanning, on-machine detection may be performed on the thinning amount, the surface groove and the flash of the friction stir welding seam with a surface appearance of a complex curved surface under a condition that a welding part is slightly deformed due to stressing and heating, and a high automation degree is realized; for a welding object which may be deformed due to stressing and heating, particularly a thin plate welding part, when a plate warps and locally inclines, the reference height can be updated in real time, a great fluctuation of the reference height for calculating the thinning amount is avoided, the thinning amount has a relatively accurate detection result, and meanwhile, the groove and the flash are rapidly and accurately judged, reference is provided for later processing by feeding back relevant accurate welding quality information, a production efficiency and the welding quality may be further improved, a welding speed of 0.4 m/min to 2 m/min can be adapted, and a real-time detection effect is achieved.

In the drawings: 1. industrial personal computer; 2. Ethernet switch; 3. controller; 4. PLC; 5. line laser scanner; 501. line laser; 6. numerically-controlled machine tool; 601. C shaft; 602. stirring pin; 7. X-axis grating; 701. X-axis-direction incremental grating ruler; 702. X-axis-direction reading head; 801. Y-axis-direction incremental grating ruler; 802. Y-axis-direction reading head; 9. XOR operation and amplification circuit; 10. welding seam; 11. air jet.

DETAILED DESCRIPTION OF PREFERRED EMBODIMENTS

In order to make those skilled in the art better understand the technical solutions in the present invention, the following clearly and completely describes the technical solutions of the embodiments of the present invention with reference to the accompanying drawings in the embodiments of the present invention.

Figure 1:
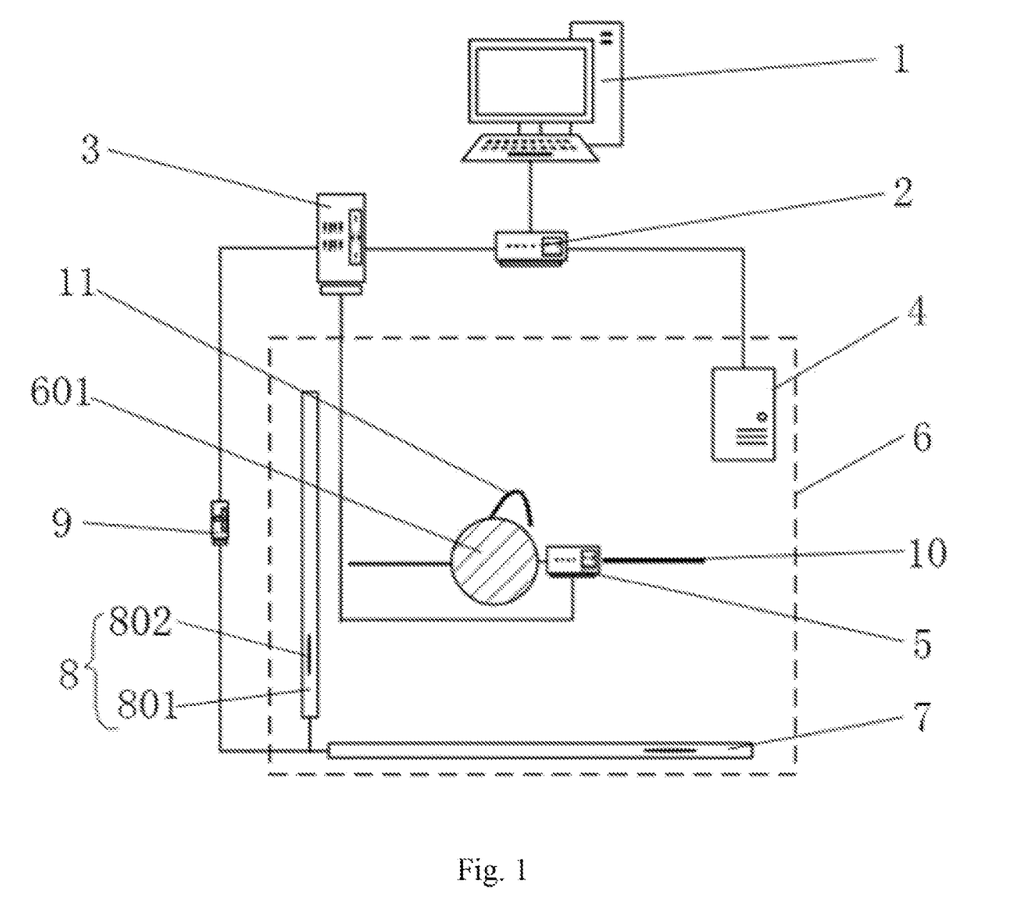
FIG. 1 is a schematic structural diagram of a detection system in a preferred embodiment of the present invention.

FIG. 1 is a structural diagram of a detection system for detecting a welding quality in the present invention, which includes an industrial personal computer 1, an Ethernet switch 2, a controller 3, a PLC 4, a line laser scanner 5, and a numerically-controlled machine tool 6. The industrial personal computer 1 is connected with the Ethernet switch 2, the Ethernet switch 2 is connected with the controller 3 and the PLC 4, and the controller 3 is connected with the line laser scanner 5. If the line laser scanner 5 collects data in an encoder triggering mode, the detection system further includes an X-axis grating 7 and a Y-axis grating 8, the X-axis grating 7 and the Y-axis grating 8 are mounted in an X axis direction and a Y axis direction of the numerically-controlled machine tool 6 respectively, and pulse signals may be generated when a welding direction is the X axis direction or the Y axis direction, and be merged by an XOR operation and amplification circuit 9 to be introduced into the controller 3. The X-axis grating 7 includes an X-axis-direction incremental grating ruler 701 and an X-axis-direction reading head 702, and the Y-axis grating 8 includes a Y-axis-direction incremental grating ruler 801 and a Y-axis-direction reading head 802. It should be understood that the line laser scanner 5 may also collect data in a continuous triggering mode matched with a welding speed; that is, continuous image acquisition requires correspondence between the welding speed and a scanning frequency, scanning is performed at a fixed frequency, and at this point, the X-axis grating 7 and the Y-axis grating 8 are avoided.

Figure 2:
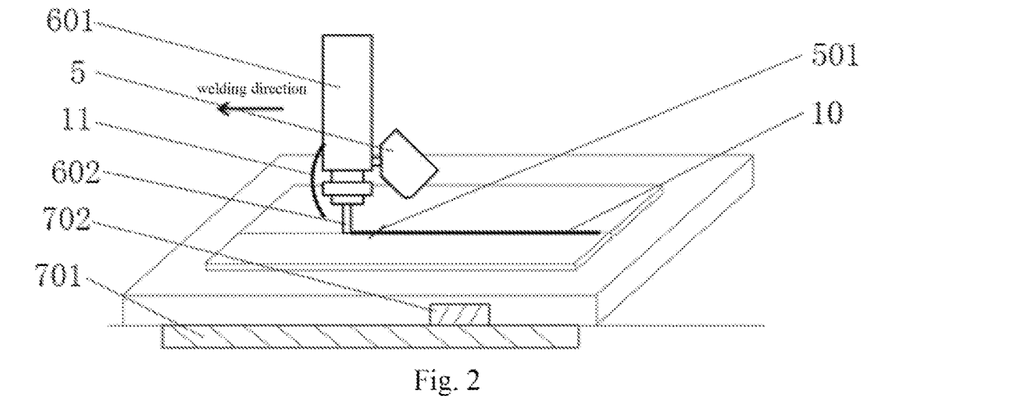
FIG. 2 is a schematic structural diagram of mounting of a line laser scanner as well as a C shaft and an X-axis grating of a machine tool in the preferred embodiment of the present invention.

Referring to FIG. 2, the line laser scanner 5 is mounted on a rear side of a C shaft 601 of the numerically-controlled machine tool 6 in a moving direction, so as to ensure safety and reduce interference of flying debris during a welding process; meanwhile, a line laser 501 of the line laser scanner 5 is irradiated on a friction stir welding seam 10 during the welding process, and the welding direction is vertically bisected by the line laser 501. The X-axis-direction incremental grating ruler 701 and the X-axis-direction reading head 702 of the X-axis grating 7 are mounted on an object table and a base of the numerically-controlled machine tool 6 respectively, and the Y-axis-direction incremental grating ruler 801 and the Y-axis-direction reading head 802 of the Y-axis grating 8 are mounted on the object table and the base of the numerically-controlled machine tool 6. The X-axis-direction incremental grating ruler 701 and the Y-axis-direction incremental grating ruler 801 are kept static, and the X-axis-direction reading head 702 and the Y-axis-direction reading head 802 can move, such that the pulse signal is generated by relative movement and serves as a trigger signal of the line laser scanner 5 in the welding process.

In order to continuously jet air during the welding process to remove the flying debris generated during the welding process, an air jet 11 is provided beside a stirring pin 602 of the C shaft 601 to reduce interference of the flying debris in a depth image.

Since a certain distance exists between the line laser 501 of the line laser scanner 5 and the stirring pin 602, and a measuring range of the laser is limited, in order to ensure that acquisition of the surface depth image of the welding seam is not interfered by rotation of the C shaft 601 of the numerically-controlled machine tool 6 in the welding process, in the embodiment of the present invention, a straight welding seam is mainly detected. During the welding process, the line laser scanner 5 moves simultaneously in a direction of the welding seam and continuously acquires depth information of a surface of the welding seam.

When a welding motion starts, the X-axis grating 7 and the Y-axis grating 8 generate pulses, the pulses are input to the controller 3, the controller 3 receives the pulses, counts the pulses and controls the line laser scanner 5 to scan the welding seam 10 to obtain the image, and the Ethernet switch 2 can connect the controller 3, the industrial personal computer 1 and the PLC 4 for communication.

In order to quickly and relatively accurately realize quick detection of the surface welding quality, in the present invention, the line laser scanning mode is preferably used to obtain the surface depth image of the friction stir welding seam 10, and calculation of a thinning amount and feature extraction of defects of grooves, flashes, or the like, are preformed based on the image.

The embodiment of the present invention discloses a method for detecting a surface welding quality of friction stir welding, which includes the following steps:

(1) acquiring a continuous surface depth image of a welding seam;

(2) intercepting a surface depth image segment of the welding seam with a proper step size;

(3) dividing the intercepted surface depth image segments of the welding seam into a front reference region, a thinned region and a rear reference region;

(4) calculating flatness of the front reference region and the rear reference region, judging whether the flatness of the front reference region is less than a threshold, and if yes, taking a height of the front reference region at this point as a latest reference height; if no, judging whether the flatness of the rear reference region is less than the threshold, and if yes, taking a height of the rear reference region at this point as the latest reference height; if no, taking the reference height of the previous depth image segment as the latest reference height; and (5) calculating a difference between the latest reference height and an average height of the thinned region at this point to obtain a thinning amount.

Preferably, the surface depth image segments of the welding seam are intercepted at equal intervals with the appropriate step size as a unit length, the step size being a length along a length direction of the welding seam. The step size is a set fixed value which can be 1 mm, and when the welding seam is thin and short, a value less than 1 mm can be taken; when the welding seam is wide and long, a value greater than 1 mm may be taken. Depth image scanning and image segment intercepting are performed at the same time, the image segment may be intercepted for processing when the scanned image can reach the step size, and a newly scanned image is waited after the intercepted image segment is processed, and immediately processed as long as the newly scanned image reaches the step size.

The thinning amount is one of important detection indexes, and since a large thinning amount means that a certain position of a welding part becomes quite thin to affect the welding quality and rigidity of a material, the thinning amount is required to be detected. Since a thin plate may be deformed during welding of the plate, this "reference" is changed; the surface depth image of the welding seam is cut into small segments at equal intervals according to the step size, the difference between the "reference" and the "thinned region" is calculated in each small segment to obtain the thinning amount of the small segment, and then, the thinning amounts are recorded in sequence to serve as the thinning amount of the welding seam.

Figure 3:
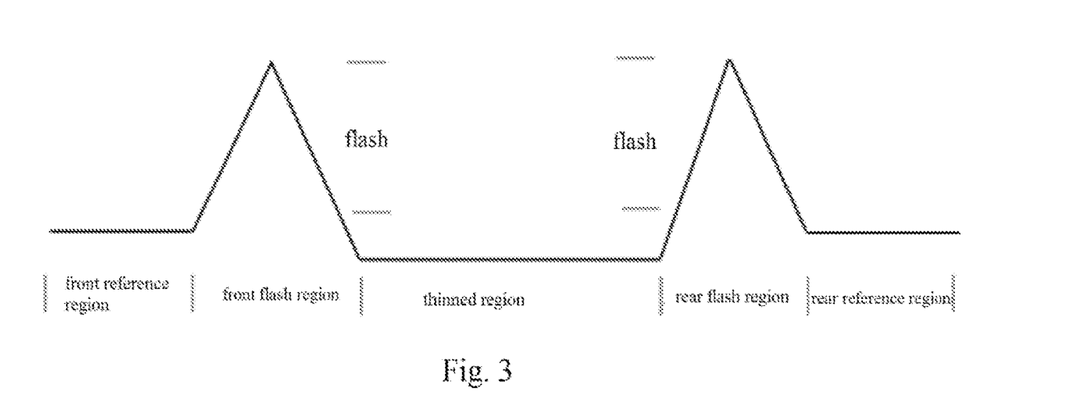
FIG. 3 is a sectional view of a friction stir welding seam in the preferred embodiment of the present invention.
Figure 4:
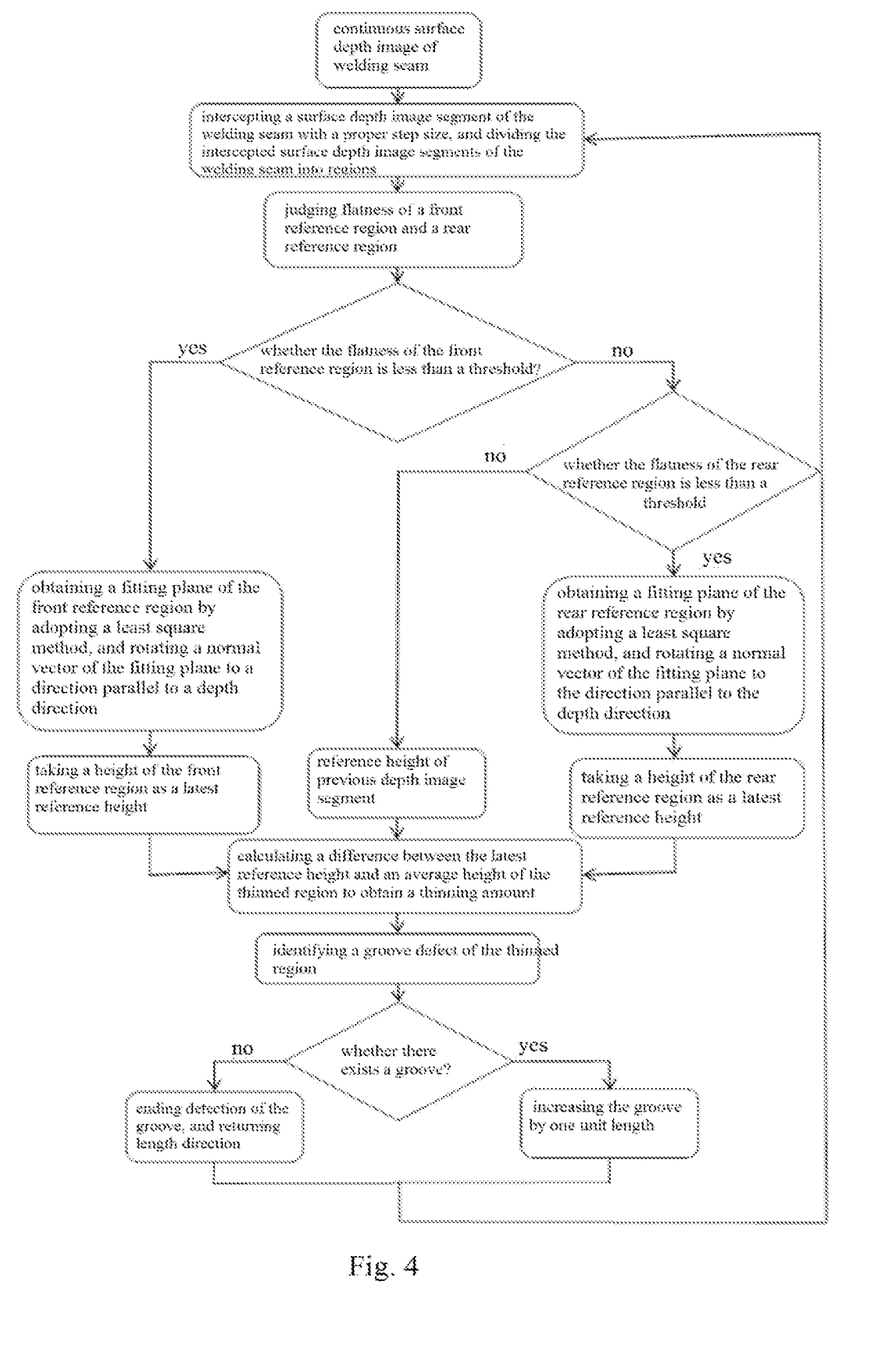
FIG. 4 is a flow chart of detection of a thinning amount and a groove defect in the preferred embodiment of the present invention.

A cross section of the welding seam 10 is shown in FIG. 3. A detection method for the thinning amount and the groove in one step size is explained below, as shown in FIG. 4.

Firstly, the flatness of the front reference region and the rear reference region is judged. The image segments on two sides of each depth image segment with one step size are selected to be used as the front reference region and the rear reference region respectively, the two sides refer to portions where the plates are connected, standard deviations of pixel values of the front reference region and the rear reference region are calculated respectively, and a small standard deviation of the pixel values indicates relative flatness. If the flatness of the front reference region is less than the threshold, a fitting plane of the front reference region is obtained by adopting a least square method, and a normal vector of the fitting plane is rotated to a direction parallel to a depth direction. That is, a region with a fixed number of columns in a front edge of the depth image segment is selected as the reference region, one plane is fitted in the region by using the least square method, the normal vector of the plane can be obtained, and then, the normal vector is rotated to the direction parallel to the depth direction, which means that the "reference" is horizontal, the depth image segment with the step size is not inclined any more, and the depth direction is perpendicular to the "reference" plane. A pixel average value of the depth image segment of the front reference region is calculated as a height of the front reference region. The height of the front reference region at this point is set as the latest reference height, and the difference between the reference height and the average height of the thinned region is calculated as a value of the thinning amount. If the flatness of the front reference region is not less than the threshold, whether the flatness of the rear reference region is less than the threshold is judged, and if the flatness of the rear reference region is less than the threshold, a fitting plane of the rear reference region is obtained by adopting a least square method, and a normal vector of the fitting plane is rotated to the direction parallel to a depth direction. That is, a region with a fixed number of columns in a rear edge of the depth image segment is selected as the "reference" region, one plane is fitted in the region by using the least square method, the normal vector of the plane can be obtained, and then, the normal vector is rotated to the direction parallel to the "depth direction", which means that the "reference" is horizontal, the depth image segment with the step size is not inclined any more, and the depth direction is perpendicular to the "reference" plane. A pixel average value of the depth image segment of the rear reference region is calculated as a height of the rear reference region. The height of the rear reference region is set as the latest reference height, and the difference between the reference height and the average height of the thinned region is calculated as the value of the thinning amount. If the flatness of the front reference region and the flatness of the rear reference region are both greater than the flatness threshold, the reference height of the previous surface depth image segment of the welding seam serves as the reference height for calculating the thinning amount. The average height of the thinned region refers to the pixel average value of the thinned region. This way may greatly reduce an influence of deformation of a welding part on the calculation of the thinning amount, and can obtain a corresponding relationship between the thinning amount and a welding stroke. The thinning amount of the welding seam 10 along a length direction is displayed, and a corresponding position of the thinning amount can be obtained, such that whether the value of the thinning amount is too large is visually known; if the thinning amount is too large, a welding pressing amount is too large, and the welding pressing amount at the position is timely adjusted to prevent the welding quality from being influenced.

If the groove exists in the welding seam, the welding part is easy to corrode or break, and therefore, the method further includes: identifying a groove defect of the thinned region, judging whether the groove exists, and if yes, accumulating a length of the groove; and if no, ending the detection of the groove, and returning length information. In detection of the groove on a surface of the welding seam, whether the groove exists is judged by calculating a fluctuation degree of the depth image segment of the thinned region or comparing a depth of the thinned region with the reference height. The calculation of the fluctuation degree of the depth image segment of the thinned region means that if the welding quality is good, the thinned region is relatively flat, the standard deviation of the depth value of the thinned region is taken as a judgment basis, and if the standard deviation is large, the thinned region is not flat and has a groove. The comparison of the depth of the thinned region with the reference height means that the pixel value in the depth image segment may also be referred to as the depth value, and if there exists a groove, the depth value in the image segment of the thinned region is small, and the depth value is compared with the pixel average value (i.e., the reference height) of the "reference" region (the image region with the fixed number of columns at the edge of the set depth image segment), and if the difference between the two values is large, there exists a groove. If there exists a groove, the groove has a continuous length, and calculation is performed by using the small "step size" during detection, such that it is equivalent to cut the groove into several small segments along a length direction in sequence, and if there exists a groove, the groove may have several continuous "small segments", and lengths of the "small segments" are accumulated in sequence to obtain a length of the groove.

Figure 5:
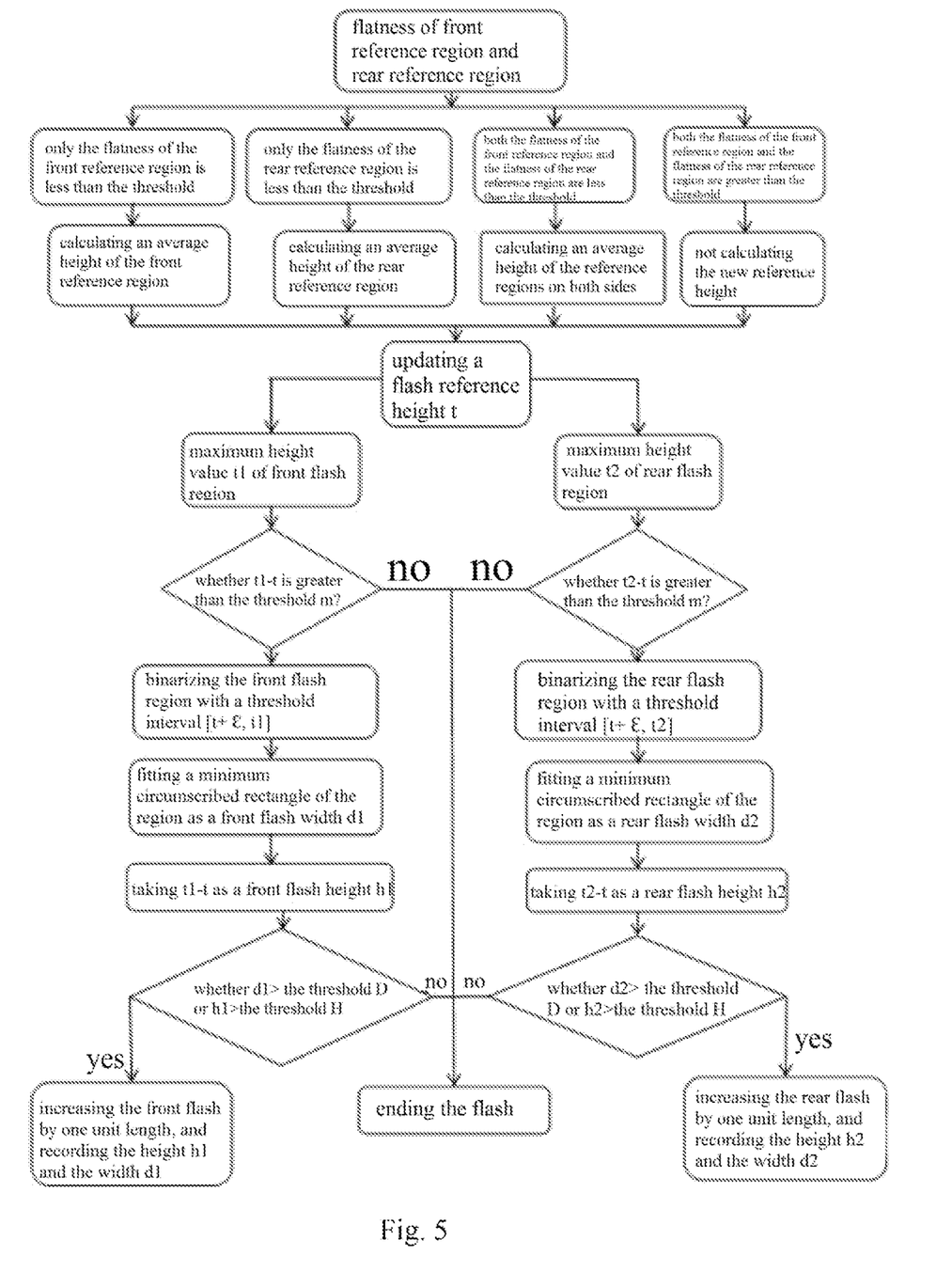
FIG. 5 is a flow chart of judgment of flashes on two sides of the welding seam in the preferred embodiment of the present invention.

The method further includes: dividing the intercepted surface depth image segments of the welding seam into a front flash region and a rear flash region, the front flash region being located between the front reference region and the thinned region, and the rear flash region being located between the rear reference region and the thinned region; and judging whether flashes exist in the front flash region and the rear flash region. FIG. 5 is a flow chart of judgment of the flashes on both sides of the welding seam using the image segments with the same step size as that for the calculation of the thinning amount. The flashes exist on both sides of the welding seam, the front flash and the rear flash are separately detected, detection processes of the front flash and the rear flash are independent, and adopted detection steps are the same.

Firstly, the flatness of the front reference region and the rear reference region is judged, a flash reference height is obtained, and whether a difference between a maximum height value of the front flash region and the flash reference height is greater than a threshold and whether a difference between a maximum height value of the rear flash region and the flash reference height is greater than the threshold are judged;

if the difference between the maximum height value of the front flash region and the flash reference height is greater than the threshold, binarization is performed on the front flash region to obtain a front flash width, a front flash height is calculated, whether at least one of the front flash width and the front flash height is greater than a corresponding threshold is judged, and if yes, one step size is increased for the front flash, and a front flash region width and a front flash region height are recorded;

if the difference between the maximum height value of the front flash region and the flash reference height is not greater than the height threshold, the judgment of the flash of the front flash region is finished;

if the difference between the maximum height value of the rear flash region and the flash reference height is greater than the threshold, binarization is performed on the rear flash region to obtain a rear flash width, a rear flash height is calculated, whether at least one of the rear flash width and the rear flash height is greater than a corresponding threshold is judged, and if yes, one step size is increased for the rear flash, and a rear flash region width and a rear flash region height are recorded; and  if the difference between the maximum height value of the rear flash region and the flash reference height is not greater than the threshold, the judgment of the flash of the rear flash region is finished.

After judgment of the flatness of the front reference region and the rear reference region, judgment is performed according to four conditions to obtain the flash reference height t. When only the flatness of the front reference region is less than the threshold, an average height of the front reference region is calculated as the flash reference height t; when only the flatness of the rear reference region is less than the threshold, an average height of the rear reference region is calculated as the flash reference height t; when the flatness of the front reference region and the flatness of the rear reference region are both less than the threshold, an average height of the front reference region and the rear reference region is calculated as the flash reference height t; when the flatness of the front reference region and the flatness of the rear reference region are both greater than the threshold, the latest reference height calculated previously is taken as the flash reference height t, and the reference height of the previous image segment is selected as the latest reference height; that is, under a condition that the reference at this point is shielded, the reference height of the previous image segment is closest to the position of the depth image segment at this point on the welding seam, and deformation interference can be reduced to the maximum extent. The average height of the front reference region refers to the pixel average value of the front reference region, and the average height of the rear reference region refers to the pixel average value of the rear reference region. The average height of the front reference region and the rear reference region refers to the pixel average value of the front reference region and the rear reference region.

A small threshold m is set.

Figure 6:
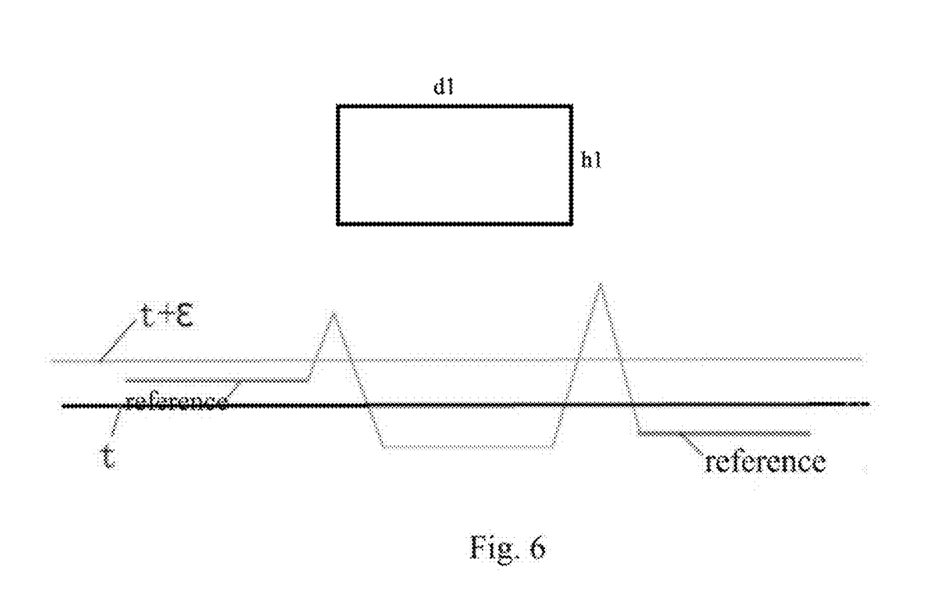
FIG. 6 is a schematic diagram in which a judgment reference is raised when reference heights on two sides are different in the preferred embodiment of the present invention.

If the maximum height value t1 of the front flash region and the flash reference height t are greater than the threshold m, and if heights of the two plates are not consistent, references on the two sides may have different heights (i.e., misalignment); in this case, if the average value of the two sides (i.e., t) is taken, the flash may be misjudged due to the misalignment; that is, a portion which is not a flash tends to be judged as a flash, and therefore, t is increased by ε to increase the judgment reference, as shown in FIG. 6, and erroneous judgment is avoided. The front flash region is binarized using a threshold interval [t+ε, t1] greater than the flash reference height t, a minimum circumscribed rectangle of the obtained region of interest (ROI) is fitted, a width of the minimum circumscribed rectangle is taken as a width d1 of the front flash region, and the difference between the maximum height value t1 of the front flash region and the flash reference height t is calculated as the front flash height h1. If the width d1 exceeds the threshold D1 or the height h1 exceeds the threshold H1, it is determined that the flash is present, flash length information of the front flash region is increased by one step size, and the width d1 and the height h1 of the front flash region are recorded. If the difference between the maximum height value t1 of the front flash region and the flash reference height is not greater than the threshold m, it is determined that the flash of the front flash region is ended.

If the maximum height value t2 of the rear flash region and the flash reference height t are greater than the threshold m, and if the heights of the two plates are not consistent, references on the two sides may have different heights (i.e., misalignment); in this case, if the average value of the two sides (i.e., t) is taken, the flash may be misjudged due to the misalignment, and therefore, t is increased by ε to increase the judgment reference, as shown in FIG. 6, and erroneous judgment is avoided. The rear flash region is binarized using a threshold interval [t+ε, t2] greater than the flash reference height t, a minimum circumscribed rectangle of the obtained region of interest (ROI) is fitted, a width of the minimum circumscribed rectangle is taken as a width d2 of the rear flash region, and the difference between the maximum height value t2 of the rear flash region and the flash reference height t is calculated as the rear flash region height h2. If the width d2 exceeds the threshold D2 or the height h2 exceeds the threshold H2, it is determined that the flash is present, length information of the rear flash region is increased by one step size, and the width d2 and the height h2 of the rear flash region are recorded. If the difference between the maximum height value t2 of the rear flash region and the flash reference height t is not greater than the threshold m, it is determined that the flash of the rear flash region is ended.

It will be apparent to those skilled in the art that this invention is not limited to the above-described exemplary embodiments. This invention can be embodied in other specific forms without departing from the spirit or essential characteristics of the invention. Accordingly, the embodiments should be regarded in all points of view as exemplary and not restrictive, the scope of the invention being defined by the appended claims rather than the foregoing description. It is therefore intended that the scope of the invention be defined by the appended claims rather than by the foregoing description. All changes within the meaning and range of equivalents of the elements are embraced in the present invention. Any reference sign in a claim should not be construed as limiting the claim concerned.

In addition, it should be understood that although this specification is described according to implementation modes, not each implementation mode only includes an independent technical solution, and this description in the specification is only for clarity, and those skilled in the art should take the specification as a whole, the technical solutions in the various embodiments can also be properly combined to form other implementations that can be understood by those skilled in the art.

What is claimed is:

1. A method for detecting a surface welding quality of friction stir welding, comprising the following steps:
    (1) acquiring a continuous surface depth image of a welding seam;
    (2) intercepting surface depth image segments of the welding seam with a first predetermined step size, and dividing the intercepted surface depth image segments of the welding seam into a front reference region, a thinned region and a rear reference region;
    (3) judging whether flatness of the front reference region is less than a threshold, and if yes, taking a height of the front reference region at this point as a latest reference height; if no, judging whether the flatness of the rear reference region is less than the threshold, and if yes, taking a height of the rear reference region at this point as the latest reference height; if no, taking the reference height of the previous depth image segment as the latest reference height; and
    (4) calculating a difference between the latest reference height and an average height of the thinned region at this point to obtain a thinning amount.

2. The method for detecting a surface welding quality of friction stir welding according to claim 1, wherein in step (3), if the flatness of the front reference region is less than the threshold, a fitting plane of the front reference region is obtained by adopting a least square method, and a normal vector of the fitting plane is rotated to a direction parallel to a depth direction.

3. The method for detecting a surface welding quality of friction stir welding according to claim 1, wherein if the flatness of the rear reference region is less than the threshold, a fitting plane of the rear reference region is obtained by adopting a least square method, and a normal vector of the fitting plane is rotated to the direction parallel to the depth direction.

4. The method for detecting a surface welding quality of friction stir welding according to claim 1, further comprising: identifying a groove defect of the thinned region, judging whether a groove exists, and if yes, accumulating a length of the groove; and if no, ending the detection of the groove, and returning length information.

5. The method for detecting a surface welding quality of friction stir welding according to claim 4, wherein whether the groove exists is judged by calculating a fluctuation degree of the surface depth image segment of the welding seam of the thinned region or comparing a depth of the surface depth image segment of the welding seam of the thinned region with the reference height.

6. The method for detecting a surface welding quality of friction stir welding according to claim 1, further comprising: dividing the intercepted surface depth image segments of the welding seam into a front flash region and a rear flash region, the front flash region being located between the front reference region and the thinned region, and the rear flash region being located between the rear reference region and the thinned region; and judging whether flashes exist in the front flash region and the rear flash region.

7. The method for detecting a surface welding quality of friction stir welding according to claim 6, wherein the flatness of the front reference region and the rear reference region is judged, a flash reference height is obtained, and whether a difference between a maximum height value of the front flash region and the flash reference height is greater than a threshold and whether a difference between a maximum height value of the rear flash region and the flash reference height is greater than the threshold are judged;
    if the difference between the maximum height value of the front flash region and the flash reference height is greater than the threshold, binarization is performed on the front flash region to obtain a front flash width, a front flash height is calculated, whether at least one of the front flash width and the front flash height is greater than a corresponding threshold is judged, and if yes, a second predetermined step size is increased for the front flash, and a front flash region width and a front flash region height are recorded;
    if the difference between the maximum height value of the front flash region and the flash reference height is not greater than the threshold, the judgment of the flash of the front flash region is finished;
    if the difference between the maximum height value of the rear flash region and the flash reference height is greater than the threshold, binarization is performed on the rear flash region to obtain a rear flash width, a rear flash height is calculated, whether at least one of the rear flash width and the rear flash height is greater than a corresponding threshold is judged, and if yes, the second predetermined step size is increased for the rear flash, and a rear flash region width and a rear flash region height are recorded; and
    if the difference between the maximum height value of the rear flash region and the flash reference height is not greater than the threshold, the judgment of the flash of the rear flash region is finished.

8. The method for detecting a surface welding quality of friction stir welding according to claim 7, wherein the front flash region is binarized, a circumscribed rectangle of the obtained region of interest is fitted, a width of the circumscribed rectangle is taken as a front flash width, and the difference between the maximum height value of the front flash region and the flash reference height is calculated as the front flash height.

9. The method for detecting a surface welding quality of friction stir welding according to claim 7, wherein the rear flash region is binarized, a circumscribed rectangle of the obtained region of interest is fitted, a width of the circumscribed rectangle is taken as a rear flash width, and the difference between the maximum height value of the rear flash region and the flash reference height is calculated as the rear flash height.

10. The method for detecting a surface welding quality of friction stir welding according to claim 7, wherein when only the flatness of the front reference region is less than the threshold, an average height of the front reference region is calculated as the flash reference height; when only the flatness of the rear reference region is less than the threshold, an average height of the rear reference region is calculated as the flash reference height; when the flatness of the front reference region and the flatness of the rear reference region are both less than the threshold, an average height of the front reference region and the rear reference region is calculated as the flash reference height; when the flatness of the front reference region and the flatness of the rear reference region are both greater than the threshold, the latest reference height calculated previously is taken as the flash reference height.

\* \* \* \* \*